Aug. 4, 1942.   F. TURRETTINI   2,291,665
MACHINE TOOL
Filed May 10, 1940

Inventor,
F. Turrettini
By Glascock Downing & Seebold
Attys.

Patented Aug. 4, 1942

2,291,665

UNITED STATES PATENT OFFICE 2,291,665

MACHINE TOOL

Fernand Turrettini, Bellevue-Geneva, Switzerland, assignor to the firm Societe Genevoise d'Instruments de Physique, Geneva, Switzerland, a firm of Switzerland Application May 10, 1940, Serial No. 334,439
In Switzerland June 30, 1939

2 Claims. (Cl. 77—55)

The present invention relates to a precision machine tool having a work table which is guided on rollers. More particularly, the invention has reference to precision machine tools of the type having a plurality of roller or like bearings arranged in parallel series between the stationary machine bed and the movable table.

In such machine tools the rolling contact renders the movable part of the machine extremely sensitive to the efforts tending to move it from the static condition, and it is, therefore, necessary to provide for an accurate adjustment of the comparatively heavy movable part in the exact working position and moreover, to eliminate every lost motion of this part in the adjusted position.

The object of the invention is to devise a machine tool of the above kind having improved means for locking the table in the adjusted working position which, by reason of the roller guide, would otherwise fail to be rigid, said means being adapted to render the table completely immovable in whatever direction.

Other objects and advantages will appear from the following description, reference being had to the accompanying drawings which illustrate, by way of example, one embodiment of the invention and a modification.

Figure 1:
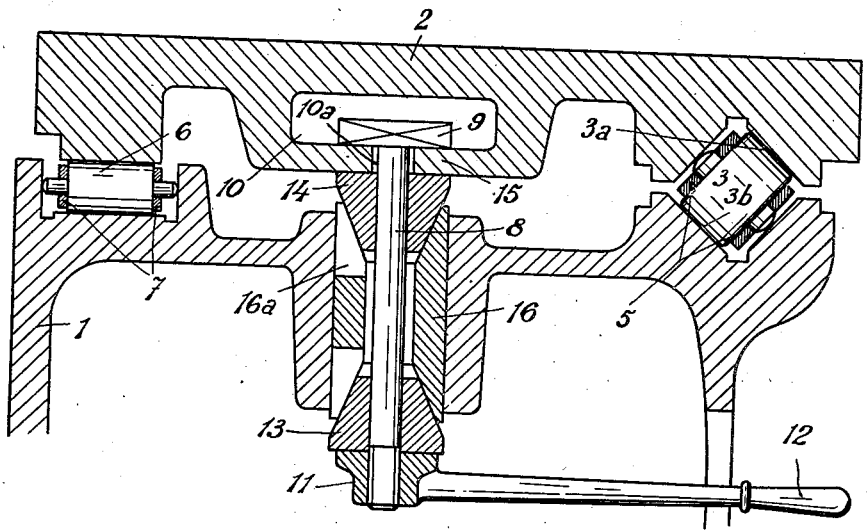
Fig. 1 is a detail sectional view of a jig boring machine according to the embodiment of the invention, said machine having a vertical spindle.
Figures 2, 3:
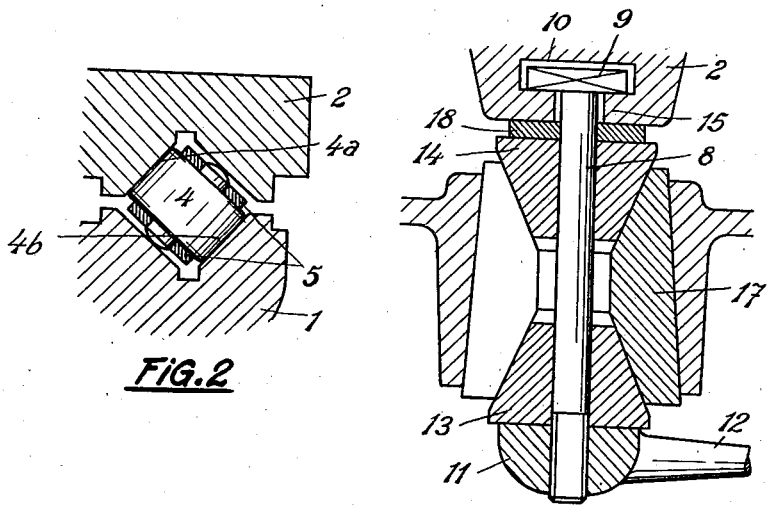
Fig. 2 shows a detail.
Fig. 3 is a detail sectional view of the modification.

The jig boring machine shown in the Figures 1 and 2 comprises a machine bed 1 carrying the work table 2 slidable on said bed. To this table is fixed the work piece which is to be machined by means of a vertical spindle not shown in the drawings. Also the displacing mechanism of the table and the measuring device for determining this displacement are not represented in the drawings.

The bed carries the table by the intermediary of two slides, of which the one shown on the right side of Fig. 1 encloses cylindrical rollers 3 and 4 alternatively inclined in opposite directions and held in a guide casing 5. The rollers 3, one of which is shown in Fig. 1, roll on inclined guiding surfaces 3a and 3b disposed on the table and the bed, respectively, while the rollers 4, one of which is shown in Fig. 2, roll on guiding surfaces 4a and 4b similarly disposed on the table and the bed, respectively. and inclined in the opposite directions with respect to the guiding surfaces 3a and 3b. The other slide encloses rollers 6 of horizontal axis, retained in a guide casing 7. The table assumes its position on the rollers under the influence of its own weight, and thereby avoids every back lash. Particularly, when moving longitudinally, the table reaches the working position without transversal back lash.

The locking of the table in the working position on the bed is obtained by means of a clamping device comprising a tie bolt 8 transversing a longitudinal slot 10a of the table and provided with a head 9 engaging with a longitudinal groove 10 of the table. The tie bolt 8, the axis of which lies in the longitudinal middle plane of the table, carries at its lower end a clamping nut 11 provided with a handle 12, and passes, on the one hand, through a female cone 16 lodged in the bed 1 and slotted at 16a so as to be radially expansible, and, on the other hand, through two male cones 13 and 14 engaging with the female cone. Upon tightening the nut 11, the portion 15 of the table is clamped between head 9 and cone 14 by reason of the cones 13 and 14, and the female cone 16 simultaneously expands and bears firmly against the walls of its housing. The table 2 is thus rigidly secured to the bed 1 and is in no way subjected to external forces; this permits the rollers to be removed from the effects of wear and in particular from the tendency of producing prints on the bottom of their guides.

The above described device is not limited to a horizontal table, but may be made to conform as well to any other position thereof.

In cases where the forces acting upon the table, tend to remove the same from the bed, the clamping device is advantageously constructed to produce a slight tension so as to apply the table in its working position against the slides as shown in the modification of Figure 3. In this modification, the outer surface of the female cone 17 is slightly tapered conforming to and fitting into a conical bore of the bed 1. In this way, the radial expansion of the female cone, produced by the cones 13 and 14, exerts on the table a slight downward traction which gives said table a more rigid seat on the rollers without, however, endangering said rollers. Between the table and the cone 14 is disposed an adjusted washer 18 adapted to compensate for the errors of machining on the cones, the guide mechanism, and so on.

In order to eliminate the back lash between the tie bolt 8 and the cones 13 and 14, the latter may be split; thus the tightening of handle 12 supresses every back lash and gives the device the maximum of rigidity.

According to the dimensions of the body to be locked, one or several clamping devices of the above described type may be used on the same machine.

I claim:

1. A precision machine tool having a plurality of roller bearings arranged in parallel series between the stationary machine bed and the movable table, characterized by a clamping device for locking the table in the adjusted working position, said device comprising a radially expansible female cone seated in the machine bed, one or more male cones engaging with the female cone, and a tie bolt passing said cones and being connected to the table at one end, said bolt, when acted upon, being adapted, on the one hand, to clamp said table axially in cooperation with said cones and, on the other hand, to cause radial expansion of the female cone so as to render said table completely immovable in every direction.

2. A precision machine tool having a plurality of roller bearings arranged in parallel series between the stationary machine bed and the movable table, the machine bed being provided with a conical bore, characterized by a clamping device for locking the table in the adjusted working position, said device comprising an externally tapered and radially expansible female cone fitted in said conical bore of the machine bed, one or more male cones engaging with the female cone, and a tie bolt passing said cones and being connected to the table at one end, said bolt, when acted upon, being adapted, on the one hand, to clamp said table axially in cooperation with said cones and, on the other hand, to cause radial expansion of the female cone for exerting a slight downward traction upon the table to firmly apply the same against the machine bed and for rendering said table completely immovable in every direction.

FERNAND TURRETTINI.